US012520069B2

(12) United States Patent
Dobos et al.

(10) Patent No.: US 12,520,069 B2
(45) Date of Patent: Jan. 6, 2026

(54) MICROPHONE ARRANGEMENT

(71) Applicant: HARMAN INTERNATIONAL INDUSTRIES, INCORPORATED, Stamford, CT (US)

(72) Inventors: Viktor Dobos, Budapest (HU); Péter Atilla Kardos, Budapest (HU); Péter Tamás Podlócz, Budapest (HU)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 187 days.

(21) Appl. No.: 18/379,881

(22) Filed: Oct. 13, 2023

(65) Prior Publication Data

US 2024/0129656 A1 Apr. 18, 2024

(30) Foreign Application Priority Data

Oct. 14, 2022 (EP) .................................... 22201571

(51) Int. Cl.
*H04R 1/08* (2006.01)
*H04R 1/02* (2006.01)
(Continued)

(52) U.S. Cl.
CPC ............. *H04R 1/086* (2013.01); *H04R 1/028* (2013.01); *H04R 1/04* (2013.01); *H04R 1/326* (2013.01); *H04R 2499/13* (2013.01)

(58) Field of Classification Search
CPC .......... H04R 1/086; H04R 1/028; H04R 1/04; H04R 1/326; H04R 2499/13
See application file for complete search history.

(56) References Cited

U.S. PATENT DOCUMENTS 11,496,821 B2 11/2022 Diego Regla et al.
2014/0013361 A1* 1/2014 Monari ............ H04N 21/41415 725/62

(Continued)

FOREIGN PATENT DOCUMENTS

CN 210351532 U 4/2020
JP 2014216896 A 11/2014

(Continued)

OTHER PUBLICATIONS

English machine translation of JP2014216896A (Inose et al.; On-Vehicle Microphone Unit; published Nov. 2014) (Year: 2014).*

(Continued)

*Primary Examiner* — Mark Fischer
(74) *Attorney, Agent, or Firm* — BROOKS KUSHMAN P.C.

(57) ABSTRACT

A microphone arrangement comprises a microphone comprising a microphone element, a housing and a cover, the housing and the cover cooperating with one another to surround the microphone element, and the cover comprising a first opening in order to enable the respective microphone element to detect sound. The microphone arrangement further comprises a frame defining an internal volume and comprising a third opening, and a motor configured to move the microphone from a first position to a second position and from the second position to the first position. When the microphone is in the first position, the first opening is arranged on a first side of the third opening and within the internal volume defined by the frame, and, when the microphone is in the second position, the first opening is arranged on a second side of the third opening and outside of the internal volume defined by the frame.

14 Claims, 5 Drawing Sheets

(51) Int. Cl.
*H04R 1/04* (2006.01)
*H04R 1/32* (2006.01)

(56) References Cited

U.S. PATENT DOCUMENTS

| | | | | |
|---|---|---|---|---|
| 2015/0237431 | A1* | 8/2015 | Jeziorek | H04R 1/086 381/361 |
| 2020/0343627 | A1 | 10/2020 | Gahner | |
| 2021/0323477 | A1* | 10/2021 | LaCross | B60R 1/04 |

FOREIGN PATENT DOCUMENTS

| | | | |
|---|---|---|---|
| WO | 2004112426 | A1 | 12/2004 |
| WO | 2017129706 | A1 | 8/2017 |

OTHER PUBLICATIONS

English machine translation of CN210351532U (Wang et al.; Lifting microphone; published Apr. 2020) (Year: 2020).*
First Office Action for European Application No. 22201571.1-1207 dated Nov. 13, 2024, 7 pages.
Extended European Search Report dated Mar. 29, 2023 for Appn. No. 22201571.1-1207, 9 pgs.

* cited by examiner

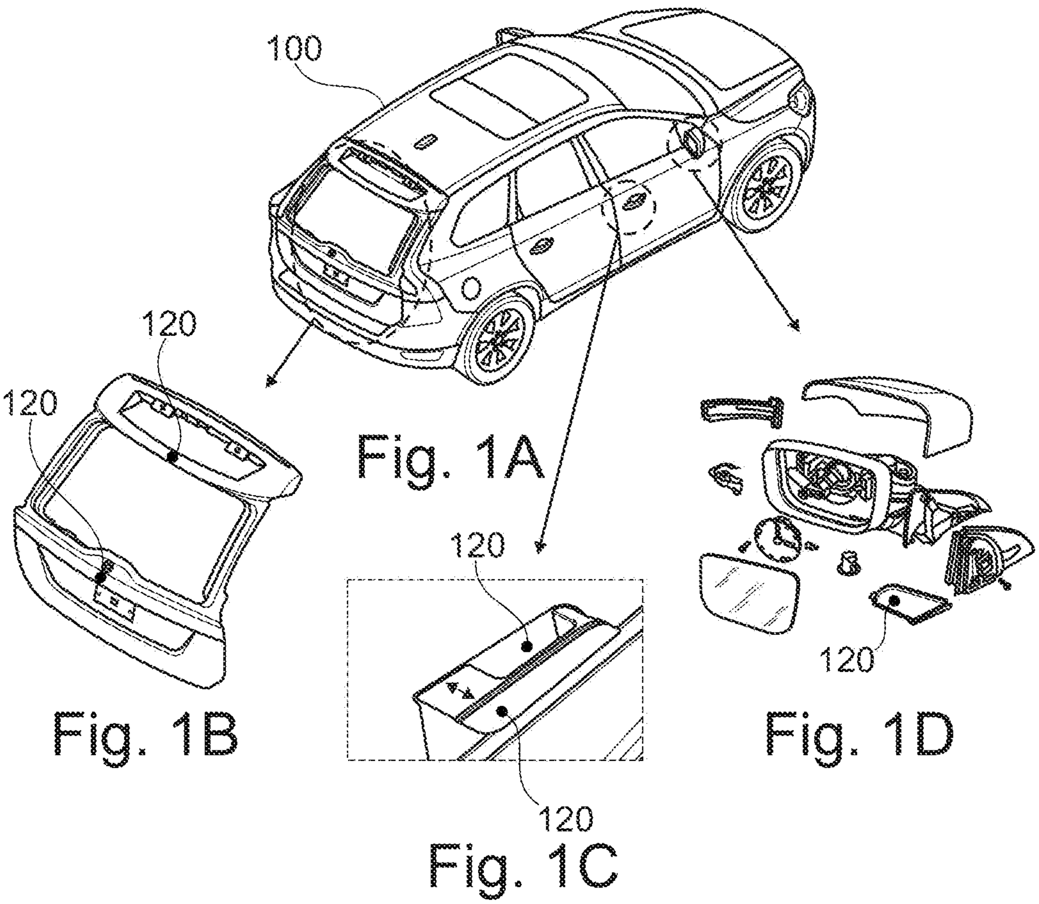
Fig. 1A
Fig. 1B
Fig. 1C
Fig. 1D
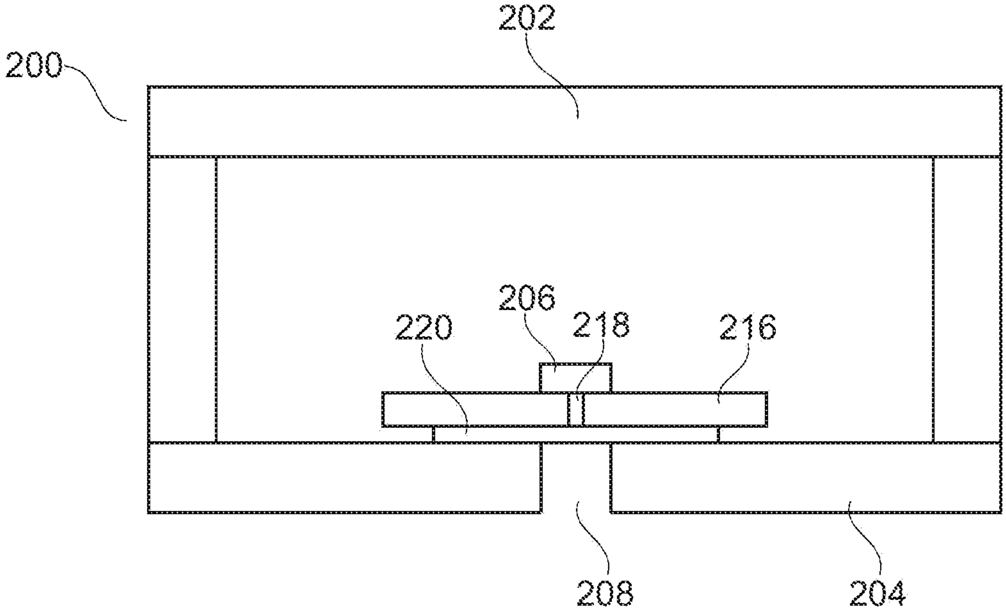
Fig. 2

MICROPHONE ARRANGEMENT

CROSS-REFERENCE TO RELATED APPLICATIONS

This application claims priority to EP Patent Application No. 22201571.1 filed on Oct. 14, 2022, the disclosure of which is hereby incorporated in its entirety by reference herein.

TECHNICAL FIELD

The disclosure relates to a microphone arrangement, in particular to a microphone arrangement for a vehicle.

BACKGROUND

Microphones may need to be arranged on an exterior portion of an automobile in order to support a plurality of vehicle applications by detecting sound outside of the automobile. Such microphones may need to be impervious to various environmental conditions such as wind, rain, snow, etc. Additionally, such microphones may be positioned on the vehicle exterior and should provide an appealing aesthetic appearance for vehicle occupants by not marring the exterior styling of the vehicle.

SUMMARY

In at least one embodiment, a microphone arrangement includes a microphone including a microphone element, a housing and a cover, the housing and the cover cooperating with one another to surround the microphone element, and the cover including a first opening in order to enable the respective microphone element to detect sound. The microphone arrangement further includes a frame defining an internal volume and including a third opening, and a motor configured to move the microphone from a first position to a second position and from the second position to the first position. When the microphone is in a first position, the first opening is arranged on a first side of the third opening and within the internal volume defined by the frame, and, when the microphone is in a second position, the first opening is arranged on a second side of the third opening and outside of the internal volume defined by the frame.

A vehicle includes an external surface including a fourth opening and a microphone arrangement mounted on a first side of the external surface on the inside of the vehicle. The third opening of the frame is aligned with the fourth opening such that, when the microphone is in the second position, the first opening is arranged on a second side of the external surface on the outside of the vehicle.

Other systems, methods, features and advantages of the disclosure will be or will become apparent to one with skill in the art upon examination of the following detailed description and figures. It is intended that all such additional systems, methods, features and advantages included within this description be within the scope of the invention and be protected by the following claims.

BRIEF DESCRIPTION OF THE DRAWINGS

The arrangement may be better understood with reference to the following description and drawings. The components in the figures are not necessarily to scale, emphasis instead being placed upon illustrating the principles of the invention. Moreover, in the figures, like referenced numerals designate corresponding parts throughout the different views.

FIGS. 1A to 1D, schematically illustrate a vehicle comprising a plurality of microphone arrangements at various locations.

FIG. 2 schematically illustrates a microphone for a microphone arrangement.

DETAILED DESCRIPTION

Figure 3:
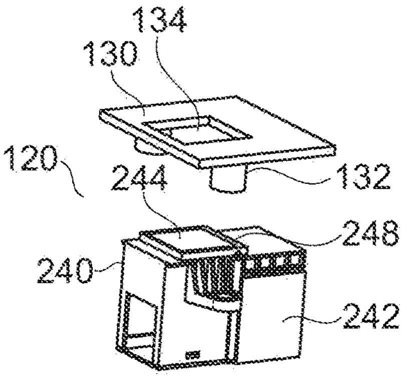
FIG. 3 schematically illustrates a microphone arrangement according to one of several embodiments and a section of an exterior surface of a vehicle distant from the microphone arrangement.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms that may be noted herein (e.g., “upper”, “lower”, “inner”, “outer”, “top”, “bottom”, etc.) simply refer to the orientation of various components of an arrangement as illustrated in the accompanying figures. Such terms are provided for context and understanding of the disclosed embodiments.

Due to the developments in the automotive industry, it has become necessary to detect sounds from the outside (or external environment) of a vehicle (i.e., a user’s command, traffic, pedestrians, emergency sirens, etc.). For example, voice recognition may be used to unlock a vehicle or to activate one or more functions of the vehicle. For example, a driver’s seat may be positioned, and an air conditioning and entertainment system could be programmed according to a driver's preferences, if a driver has been identified via voice recognition. The detection of sounds from the outside may also be necessary for many other applications. This may necessitate the installation of any number of microphones on an exterior of a vehicle. In order to function properly over the lifetime of the vehicle, the microphones not only have to withstand environmental conditions, such as wind, water, dust, mud, ice, etc. The microphone(s) may also need to be able to withstand other forms of surrounding environments, such as heat and water pressure produced during washing of the vehicle. The external microphones also have to be arranged on the exterior of the vehicle such that the microphones capture the desired sound and, at the same time, capture only little unwanted sound such as, e.g., wind noise.

The microphone arrangement as disclosed herein may be arranged to capture desired sound while being protected against environmental conditions, especially during those times when the microphone is not in use. In addition, the disclosed microphone arrangement can be easily integrated in a vehicle without impairing its appearance. These aspects and others will be discussed in more detail below.

FIG. 1A schematically illustrates a vehicle 100. One or more microphone arrangements 120 are arranged on the outside of the vehicle 100. FIGS. 1B, 1C and 1D illustrate specific parts of the vehicle 100 in greater detail. As is schematically illustrated in FIG. 1B, one or more microphone arrangements 120 may be arranged under an edge of a tailgate rim, or may be integrated into a tailgate handle, for example. Referring to FIG. 1C, one or more microphone arrangements 120, for example, may be arranged in or under a retractable door handle. FIG. 1D schematically illustrates a side view mirror with a microphone arrangement 120 arranged in a bottom surface thereof. For illustration purposes, an exploded view of the side view mirror is schematically illustrated. Alternatively or additionally, microphone arrangements 120 may be arranged in any other suitable location on the outside of the vehicle 100. This allows, among other things, the microphone arrangements 120 to capture external sound (sounds originating from the external environment of the vehicle 100). Integrating external microphone arrangements 120 in a vehicle 10 is generally a challenge. The microphone arrangements 120 need to be arranged in suitable positions to be able to capture the desired sounds. The external microphone arrangements 120 further need to be protected from environmental conditions. At the same time, the integration of external microphone arrangements 120 should not significantly change the appearance of the vehicle 100.

A cross-sectional view of a microphone 200 that can be included in a microphone arrangement 120 according to one embodiment of the disclosure is schematically illustrated in FIG. 2. The microphone 200 may include a housing 202, a cover 204, and at least one microphone element 206 (hereafter "the microphone element 206"). The microphone 200 is generally configured to be mounted on a vehicle 100. It is recognized that a portion of the vehicle 100 that houses the microphone 200 may define a cavity (not shown) that is suitable to receive the microphone 200. The microphone element 206 arranged inside the housing 202 is generally configured to detect ambient noise external to the vehicle 100 and to provide the detected ambient noise to any controller (or processor, not shown) positioned in or about the vehicle 100. The detected ambient noise may be provided to a controller wirelessly or via a wired connection, for example.

The housing 202 and the cover 204 cooperate with one another to surround the microphone element 206. The cover 204 may be orientated to face out, and away from the vehicle 100 into the environment that surrounds the vehicle 100. The housing 202 and the cover 204 may be separate components. According to one example, the cover 204 may be formed by an element of the vehicle 100. It is, however, also possible that the cover 204 and the housing 202 are integrally formed. That is, the cover 204 may be a part of the housing 202.

In one example, the microphone element 206 may be implemented as a Micro-Electro-Mechanical Systems (MEMS) microphone. The cover 204 may define a first opening 208 in order to enable the microphone element 206 to detect audio external to the vehicle 100. The first opening 208 enables the entry of acoustic sound without transforming the sound prior to receipt by the microphone element 206. A grilled cover (not shown) may be positioned in front of the cover 204. In one example, the grilled cover may be formed of sheet metal. The grilled cover may be axially spaced (or offset) from the cover.

A printed circuit board (PCB) 216 may support the microphone element 206 and may include electrical traces and bonds to electrically couple with the microphone element 206. The PCB 216 may define a second opening 218 to enable ambient sound that passes through the first opening 208 to be received by the microphone element 206. An acoustic membrane 220 may be positioned between the PCB 216 and the cover 204. The acoustic membrane 220 may be configured to enable the audio to pass therethrough and into the second opening 218 for receipt by the microphone element 206.

The acoustic membrane 220 may be configured to serve as a barrier to prevent the entry of external debris from the vehicle 10 into an interior volume of the housing 202. For example, the acoustic membrane 220 may protect the microphone element 206 from water and/or dust or other debris. As shown, the microphone element 206 may be positioned on one side of the PCB 216 and the acoustic membrane 220 may be positioned on an opposite side of the PCB 216. It is recognized that the acoustic membrane 220 itself may also require protection against a direct spray of water (e.g., water delivered to the acoustic membrane that exceeds a predetermined pressure value). Therefore, a grilled cover may be configured to prevent or reduce the pressure level of the fluid that the acoustic membrane 220 is exposed to. The microphone 200 as described with respect to FIG. 2, however, is only one example. The microphone 200 may be implemented in or on the vehicle 10 in any other suitable way.

Figure 4:
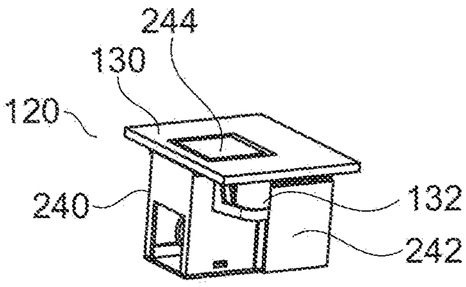
FIG. 4 schematically illustrates the microphone arrangement of FIG. 3 when mounted to the section of the exterior surface of the vehicle, when the microphone is in a closed position.
Figure 5:
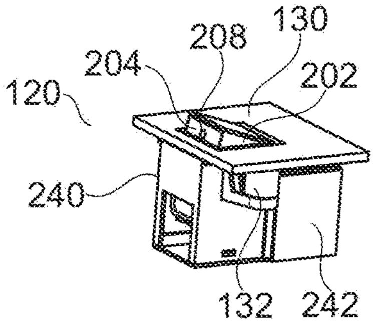
FIG. 5 schematically illustrates the microphone arrangement of FIG. 3 when mounted to the section of the exterior surface of the vehicle, when the microphone is in an in-use position.

Now referring to FIGS. 3, 4 and 5, a microphone arrangement 120 according to one embodiment of the present disclosure is schematically illustrated. The microphone arrangement 120 comprises a frame 240. The frame 240 defines an internal volume and comprises a third opening 248. The third opening 248 provides a passage between the internal volume and the outside of the frame 240. The frame 240 may have any regular or irregular shape. The microphone arrangement further comprises a microphone 200 including a microphone element 206, a housing 202 and a cover 204, the housing 202 and the cover 204 cooperating with one another to surround the microphone element 206. The housing 202 includes a first opening 208 in order to enable the respective microphone element 206 to detect sound, similar to what has been explained with respect to FIG. 2 above. The microphone 200 is not visible in the three-dimensional views of FIGS. 3 and 4, as it is arranged inside the internal volume and is concealed by the frame 240. The microphone 200 is partly visible in the three-dimensional view of FIG. 5.

The microphone arrangement 120 further comprises a motor 250 configured to move the microphone 200 from a first position to a second position and from the second position to the first position. The motor 250 may be arranged inside the internal volume defined by the frame 240 and, therefore, is not visible in the three-dimensional views of FIGS. 3, 4 and 5, as it is concealed by the frame 240. When the microphone 200 is in the first position, it may be entirely arranged inside the internal volume. In some embodiments, small portions of the microphone 200 may be arranged outside of the frame 240. However, the larger part of the microphone 200 is usually arranged inside the internal volume, for the microphone arrangement to remain visually unobtrusive when the microphone arrangement is in the first position. In any case, when the microphone 200 is in the first position, the first opening 208 of the microphone is arranged on a first side of the third opening 248 and within the internal volume defined by the frame 240. The microphone 200 may be arranged directly adjacent to the third opening 248. In particular, the microphone 200 may be arranged to entirely cover the third opening 248 on the inside of the frame 240. The housing 202, or parts of the housing 202 (e.g., a sidewall of the housing) may cover the third opening 248 from the inside of the frame 240 when the microphone 200 is in the first position. In this way, the first opening 208 is arranged inside the internal volume and is fully concealed by the frame 240. As the second opening 248 is fully covered by the housing 202 of the microphone 200, the microphone element 206 cannot receive sounds from outside of the internal volume. The microphone 200, and in particular the microphone element 206, however, are well protected from any environmental conditions outside of the internal volume in this way. No additional components are generally required to close the third opening 248, when the microphone 200 is in the first position. FIGS. 3 and 4 schematically illustrate when the microphone 200 is in the first position.

As is further illustrated in FIGS. 3 and 4, the microphone arrangement 120 may be mounted to an exterior surface 130 of a vehicle 100. FIGS. 3 and 4 schematically illustrate only a portion of an external surface 130, e.g., a section of a body work of a vehicle 100. The external surface 130 may comprise a fourth opening 134 which may be aligned with the third opening 248 of the frame 240, when the microphone arrangement 120 is attached to the exterior surface 130. FIG. 3 schematically illustrates a microphone arrangement 120 not yet mounted to the external surface 130. The microphone arrangement 120 may be mounted to a first side of the external surface 130 that faces the inside of the vehicle 100. A portion of the microphone arrangement 120 (i.e., a portion of the housing 202) may be visible through the fourth opening 134 from the outside of the vehicle 100. The microphone arrangement 120 therefore, optionally, may comprise a top cover 244 covering all portions of the microphone arrangement 120 that are visible through the fourth opening 134 when the microphone 200 is in the first position. For example, the top cover 244 may have the same appearance or may be similar in appearance as the external surface 130. In particular, the top cover 244 and the external surface 130 may be similar or identical in color. For example, the top cover 244 may be coated with the same paint as the external surface 130. In this way, the microphone arrangement 120 is not easily visible from the outside of the vehicle 100, in particular when the microphone 200 is in the first position.

In one example, the microphone arrangement 120 may be mounted to the external surface 130 by fastening elements 132. Such fastening elements 132, according to one embodiment, may comprise simple pins or rivets. One or more fastening elements 132 may be provided on the first side of the external surface 130, for example. The microphone arrangement 120 may comprise matching counterparts (not specifically illustrated) that may be securely attached to the fastening elements 132. If, for example, the fastening elements 132 comprise rivets, the counterparts provided on the microphone arrangement 120 may comprise pins that are configured to be inserted into (e.g., pressed into) the rivets. The fastening elements 132, however, may also be implemented in any other suitable way to securely attach the microphone arrangement 120 to the external surface 130. According to another example, the fastening elements 132 may even be omitted and the microphone arrangement 120 may be glued to the external surface 130.

Now referring to FIG. 4, the microphone arrangement 120 is illustrated in a mounted position. That is, the microphone arrangement 120 is securely attached to the first side of the external surface 130. FIG. 4 illustrates the microphone arrangement 120 with the microphone 200 in the first, closed position in which it is retracted in the frame 240 and, therefore, also in the bodywork (external surface 130) of the vehicle 100.

FIG. 5 schematically illustrates the microphone arrangement with the microphone 200 being in a second position. When the microphone 200 is in the second position, the microphone 200 at least partly protrudes from the frame 240 and, when mounted on a vehicle 100, from the bodywork (external surface 130) of the vehicle 100. In particular, when the microphone 200 is in the second position, at least a portion of the microphone 200 comprising the first opening 208 is arranged on a second side of the third opening 248 and outside of the internal volume defined by the frame 240. That is, when the microphone 200 is in the second position, the microphone 200 partly protrudes through the fourth opening 134. In the second position of the microphone 200, the first opening 208 is uncovered and the microphone element 206 can receive sound from outside of the internal volume and, when the microphone arrangement 120 is mounted to a vehicle 100, from the outside of the vehicle 100.

Figure 6:
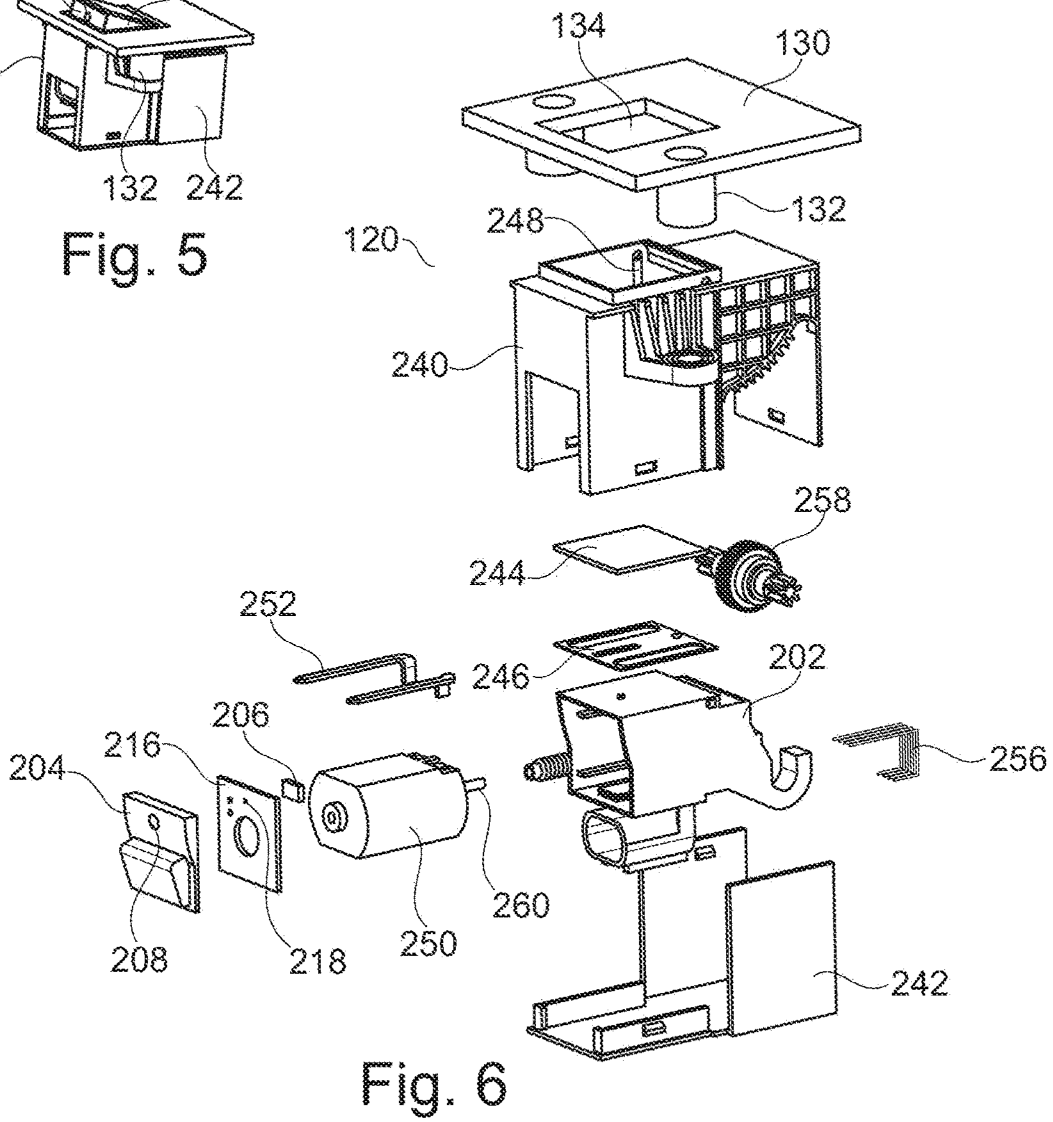
FIG. 6 schematically illustrates an exploded view of a microphone arrangement according to one of several embodiments.

FIG. 6 schematically illustrates an exploded view of a microphone arrangement 120 according to one embodiment of the disclosure. In this exploded view, any components that may be arranged inside the frame 240 and inside the internal volume are visible. In FIG. 6, a section of the external surface 130 comprising the fourth opening 134 is also illustrated. Fastening elements 132 that can be used to attach the microphone arrangement 120 to the external surface 130 are also illustrated. The microphone arrangement 120, similar to what has been described above, comprises a frame 240 defining an internal volume and comprising a third opening 248. The microphone arrangement 120 further comprises a housing 202 and a cover 204 configured to cooperate with one another to surround a microphone element 206. The cover 204 comprises a first opening 208 in order to enable the microphone element 206 to detect sound. A printed circuit board, PCB, 216 supporting the microphone element 206 and including electrical traces and bonds in order to electrically couple with the microphone element 206 may be arranged between the microphone element 206 and the first opening 208. The PCB comprises a second opening 218 which, when the microphone arrangement 120 is fully assembled, is aligned with the first opening 208 in order to enable ambient sound to be received by the microphone element 206.

The microphone arrangement 120 further comprises a motor 250 configured to move the microphone 200 from the first position to the second position and from the second position to the first position. The microphone arrangement 120 may further comprise motor terminals 252 configured to internally connect the motor and a printed circuit board assembly PCBA (not specifically illustrated in FIG. 6). The microphone arrangement 120 may further comprise connector terminals 256. A supply voltage may be provided from an external power source to the motor 250 by the connector terminals 256. The microphone arrangement 120 may further comprise a top cover 244 covering all portions of the microphone arrangement 120 that, when the microphone arrangement 120 is fully assembled and is mounted to the external surface 130, are visible through the fourth opening 134 when the microphone 200 is in the first position. An additional sealing layer 246 may be arranged between the top cover 244 and the housing 202. The third opening 248 may be further sealed by the additional sealing layer 246, when the microphone 200 is in the first position. A size (cross-sectional area) of the sealing layer 246 may correspond to a size (cross-sectional area) of the third opening 248. When the microphone 200 is arranged in the first position, the sealing layer 246 is arranged within the third opening 248 and completely fills the third opening 248. That is, no gaps or spaces exist between the sealing layer 246 and the parts of the frame 240 defining the third opening 248 through which moisture or any particles may otherwise enter the internal volume. In this way, the microphone 200 and, in particular, the first opening 208 and the microphone element 206, are even better protected from any environmental conditions when the microphone 200 is in the first position. A frame cover 242 may engage with the frame 242. The frame 240 may comprise further openings allowing the different components to be arranged within the internal volume during assembly of the microphone arrangement 120. Once all components are arranged inside the internal volume, such openings may be closed at least partly by the frame cover 242 in order to provide protection of the components towards the inside of the vehicle 100.

The microphone arrangement 120 may further comprise a gear wheel arrangement 258. The gear wheel arrangement 258 may comprise a helical gear wheel attached to a clutch, for example. Helical gears are a special type of cylindrical gears with a slanted tooth trace. The motor 250 may further comprise a worm gear 260 that engages with the helical gear wheel of the gear wheel arrangement 258 when the microphone arrangement 120 is fully assembled. The motor 250 provides the power to rotate the worm gear 260. As the worm gear 260 turns, the motor 250 is moved out of a first position towards a second position. The microphone 200 may be attached to the motor 250. Therefore, as the motor 250 moves, the microphone 200 moves together with the motor 250. In this way, the microphone 200 can be moved from the first position to the second position if the worm gear 260 turns in a first direction, and the microphone 200 can be moved back from the second position to the first position if the worm gear 260 turns in a second direction, opposite the first direction.

Figure 7:
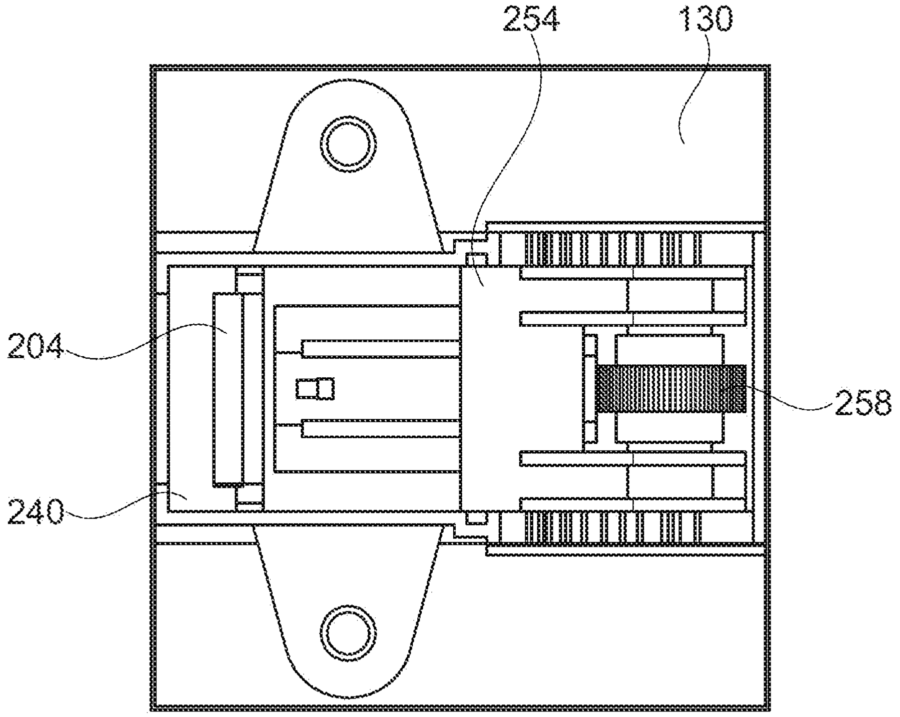
FIG. 7 schematically illustrates a bottom view of a microphone arrangement in a closed position according to one of several embodiment.
Figure 8:
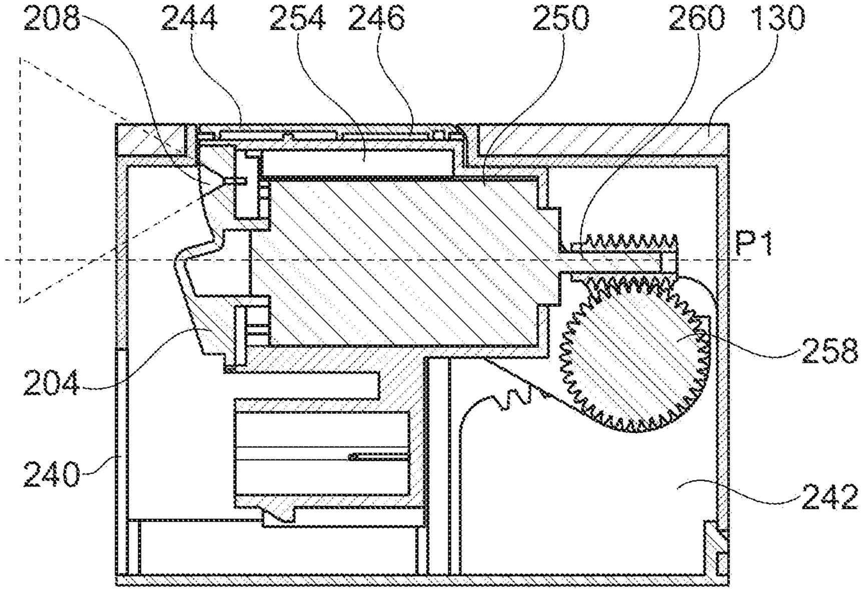
FIG. 8 schematically illustrates a side view of the microphone arrangement of FIG. 7.
Figure 10:
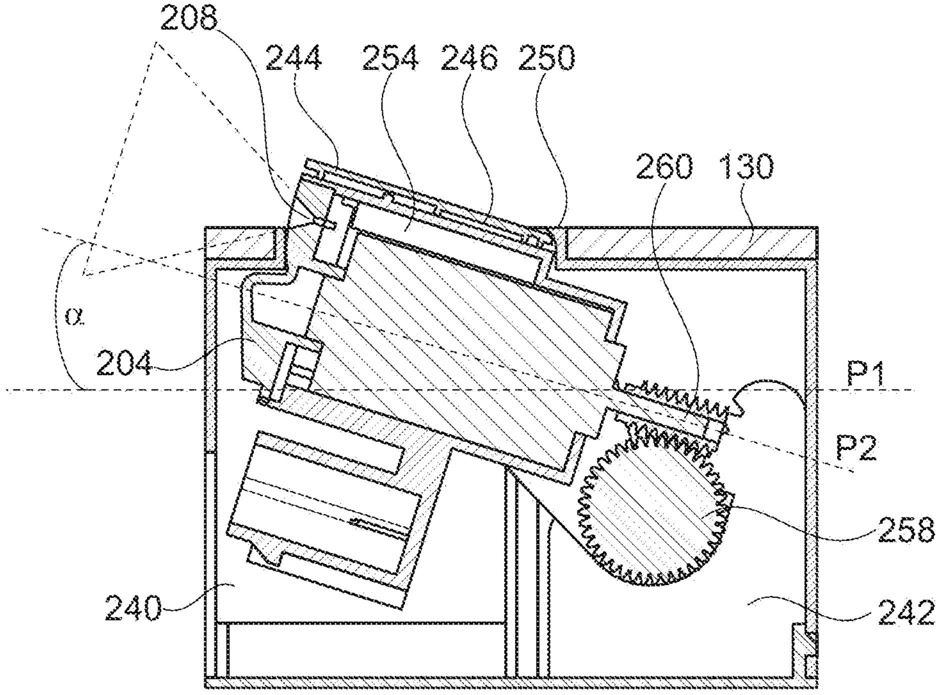
FIG. 10 schematically illustrates a side view of the microphone arrangement of FIG. 9.

The worm gear 260 and gear wheel arrangement 258 are illustrated in further detail with respect to FIGS. 8 and 10, wherein FIG. 8 schematically illustrates the microphone arrangement 120 with the motor 250 and microphone 200 in their first (closed) position, and FIG. 10 schematically illustrates the microphone arrangement 120 with the motor 250 and the microphone 200 in their second (in-use) position. As can be clearly seen in FIG. 8, the third opening 248 is closed by the housing 202 of the microphone 200 and further by the, optional, sealing layer 246 when the microphone 200 is in the first position. The (optional) top cover 244 covers all portions of the microphone arrangement 120 that would otherwise be visible through the fourth opening 134 when the microphone arrangement 120 is mounted to a vehicle 100 and is in the first position. If the top cover 244 has the same appearance or is similar in appearance as the external surface 130 (e.g., top cover 244 and external surface 130 have a similar or the same color), the microphone arrangement 120 is not easily visible from the outside of the vehicle 100 when the microphone 200 is in the first position. FIG. 7 schematically illustrates a bottom view of the arrangement of FIG. 8. Therefore, not all of the components are visible in this figure. The motor 250 and gear wheel arrangement 258, however, are merely one example. Any other kind of motor and moving mechanism may be used to move the microphone 200 from the first position to the second position and back from the second position to the first position.

Figure 9:
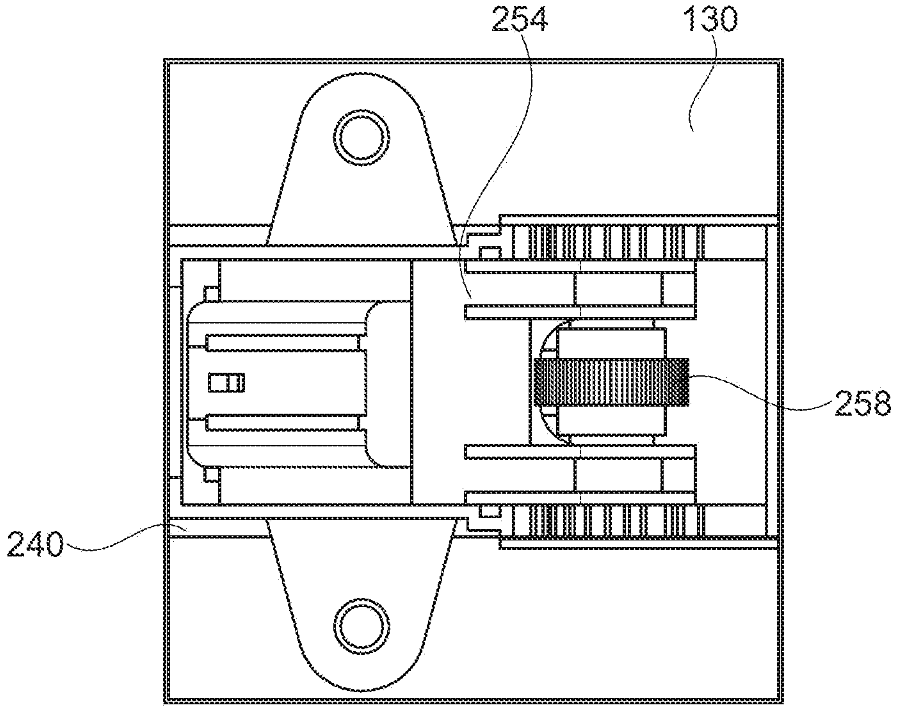
FIG. 9 schematically illustrates a bottom view of a microphone arrangement in an in-use position according to one of several embodiments.

The microphone 200 may remain in the first position during all times where it is not needed to pick up external sounds or during any times where protection of the microphone element 206 is required. When, however, the microphone 200 is needed to pick up external sounds and no special protection is required, it may be moved from the first position to the second position by the motor 250. As can be seen in FIG. 10, for example, moving the microphone 200 from the first position to the second position may comprise tilting the microphone 200. The microphone 200 is arranged in a first plane P1, when the microphone 200 is in the first position. The microphone 200 may be arranged in a second plane P2, when the microphone 200 is in the second position, wherein the second plane P2 is tilted with regard to the first plane P1. For example, an angle $\alpha$ between the first plane P1 and the second plane P2 may be between 5° and 45°, or between 10°. Any other angles $\alpha$, however, are generally also possible. By tilting the microphone 200, a portion of the microphone 200 comprising the first opening 208 moves through the fourth opening 134 and out of the internal volume. When the microphone 200 is in the second position, the first opening 208 is uncovered and the microphone element 206 can receive external sounds through the first opening 208. FIG. 9 schematically illustrates a bottom view of the arrangement of FIG. 10. Therefore, not all of the components are visible in this figure.

By only slightly tilting the microphone 200 until the first opening 208 in uncovered, the microphone arrangement 120 is still comparably unobtrusive, even if the microphone 200 is in the second position and projects from the bodywork of the vehicle 100 to a certain degree. Only a comparably small section (only few components) of the microphone arrangement 120 protrudes from the bodywork of the vehicle 100, when the microphone arrangement 120 is mounted to a vehicle 100 and the microphone 200 is in the second position.

For example, the microphone 200 may be moved from the first position to the second position when the microphone 200 is detected that a user approaches the vehicle 100. A user approaching the vehicle 100 may be detected in any suitable way. For example, the microphone 200, when in the second position, can then pick up the voice of the user. According to one embodiment of the disclosure, voice recognition may be performed and access to the vehicle 100 may be granted when the user is identified as an authorized user. When the user has been identified as an authorized user, or when it has been detected that the user is not an authorized user and the microphone arrangement 120 is not needed anymore to pick up external sounds, the microphone 200 may be moved back into the first position. Using the microphone arrangement 120 to perform voice recognition, however, is only one example. Generally, the microphone arrangement 120 can be used for any other application which requires to pick up sound external to a vehicle 100. The microphone 200, however, is only moved into the second position when it is needed for the specific application. During all times where it is not required to pick up external sound, it may remain well protected in the first position. According to another embodiment of the disclosure, the microphone 200 may remain in the second position until the microphone 200 is detected and the microphone 200 (i.e., the microphone element 206) needs to be protected from any environmental conditions.

The vehicle 100 may include various vehicle ECUs (electric control units). The ECUs may include a powertrain control module configured to provide control of engine operating components, a body control module, among others. The ECUs may provide a vehicle state indicative of a status of the vehicle such as drive, neutral, park, reverse, standby, etc. The vehicle 100 may also include a global positioning system (GPS) module configured to provide a current location and heading information. The location of the vehicle 100 may indicate the presence of the vehicle 100 at a specific establishment, such as a car wash.

The ECUs and GPS module may be included in the vehicle's computing platform. Further, the microphone arrangement 120 may include a computing platform as well, either via the PCB 218 or another component. Each of the microphone arrangement 120 and vehicle 100 may include a controller that may include one or more processors configured to perform instructions, commands and other routines in support of the processes described herein. For instance, the PCB 218 and/or the ECUs may be configured to determine if and when to move the microphone 200 into a closed position (first position) to protect the microphone element 206. At least one of the controllers may instruct the motor 250 to move the microphone 200, to achieve the closed position. The controller may also instruct the motor 250 to move the microphone 200 back to an open position (second position) so that the microphone arrangement 120 may continue acquiring noise signals from the exterior of the vehicle 100.

The controller may determine that the microphone arrangement 120 should be in the closed position (first position) in response to receiving an indication of an environmental condition relevant to the microphone protection. In one example, this indication may come in response to the ECU indicating that the vehicle 100 is in a certain state, such as park or neutral. In the park and neutral states, autonomous features may not be in use or needed and therefore signals provided by the microphone arrangement may not be necessary. In this case, to protect the microphone arrangement 120, the controller may instruct the motor 250 to move the microphone 200 into the closed position (first position). Notably, during a car wash, the vehicle 100 is assumed to be in park, or possibly neutral for automatic car washes. Thus, in these states, the microphone arrangement 120 will be closed and thus protected from any potential high pressure or heat.

In another example, the indication may be received from the GPS module indicating the location of a vehicle 100 at a known car wash establishment. This too may trigger the microphone arrangement 120 to close and thus protect the microphone element 206. In this example, the microphone arrangement 120 may close regardless of the vehicle state received from the ECUs. Additionally or alternatively, both indications may be required prior to the controller sending instructions for the microphone arrangement 120 to close.

Such instructions and other data may be maintained in a non-volatile manner using a variety of types of computer-readable storage medium (not shown). The computer-readable medium (also referred to as a processor-readable medium or storage) includes any non-transitory medium (e.g., a tangible medium) that participates in providing instructions or other data that may be read by the processor or controllers described herein. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The vehicle 100 may be in communication with a network such as a cloud network, packet-switched network services (e.g., Internet access, VoIP communication services), cellular telephone network, etc. Data may be transmitted between the vehicle 100 and the network. In one example, GPS locations associated with known car wash establishments may be transmitted and used to indicate the presence of a vehicle at such locations.

Figure 11:
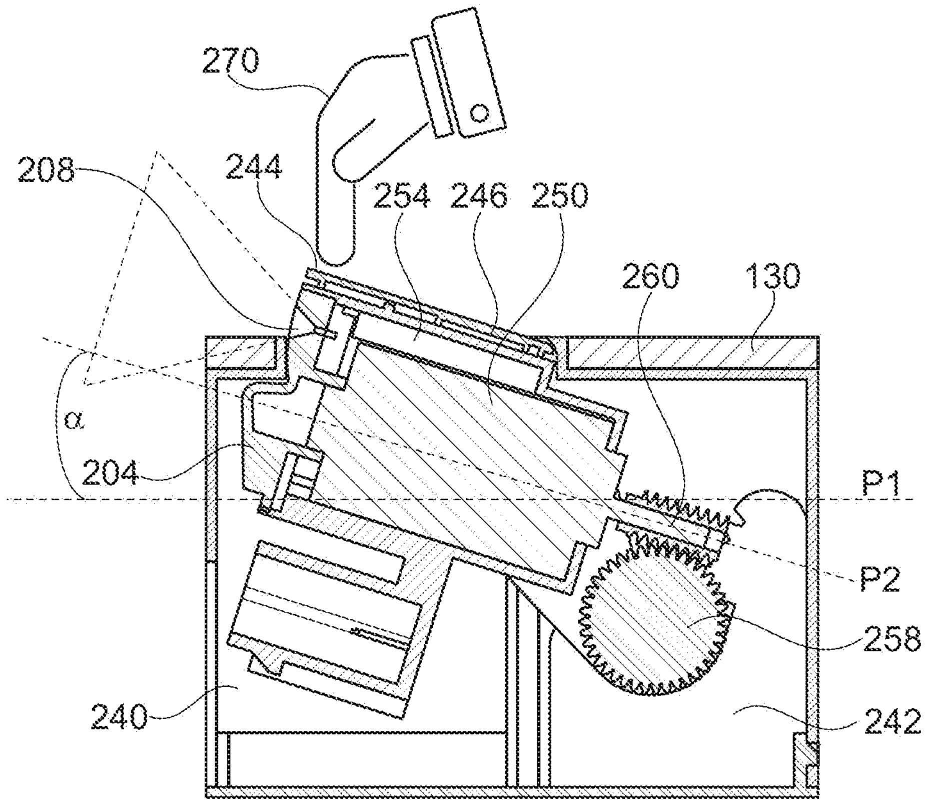
FIG. 11 schematically illustrates the microphone arrangement of FIG. 10 and a hand of a person accidentally applying pressure to the microphone arrangement in its in-use position.
Figure 12:
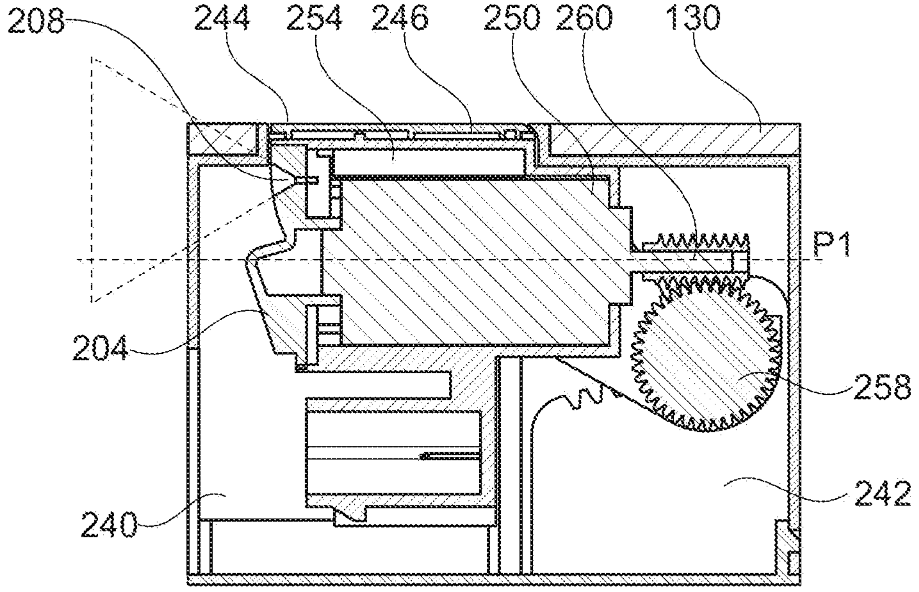
FIG. 12 schematically illustrates the microphone arrangement of FIG. 11 after having been accidentally closed by a person.

As is schematically illustrated in FIG. 11, there is a risk that a user 270 or an object of any kind exerts a force on the microphone 200 when the microphone 200 is in the second position (open position or in-use position). Through such a force, the microphone 200 may be pushed from the second position to the first position without the motor 250 being activated (motor forcibly driven back to the first position). The gear wheel arrangement 258 and/or the worm gear 260 may generally be damaged in this process, as the worm gear 260 generally cannot drive back (rotate) without the motor 250 being activated. The clutch, however, may prevent the components from being damaged when the microphone 200 is unintentionally forced from the second position in the first position. As is schematically illustrated in FIG. 12, an unintentional closing of the microphone arrangement 120 (e.g., moving the microphone 200 from the second position to the first position) does not result in any damages.

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should not be understood as excluding the plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly disclose subject matter from the above description that is regarded to be novel and non-obvious.

What is claimed is:

1. A microphone arrangement comprising:

a microphone including a microphone element, a housing and a cover, the housing and the cover cooperating with one another to surround the microphone element, and the cover including a first opening to enable the respective microphone element to detect sound;

a frame defining an internal volume and including a third opening; and a motor configured to move the microphone from a first position to a second position and from the second position to the first position; wherein when the microphone is in the first position, the first opening is arranged on a first side of the third opening and within the internal volume defined by the frame, and when the microphone is in the second position, the first opening is arranged on a second side of the third opening and outside of the internal volume defined by the frame, the microphone is arranged directly adjacent to the third opening, when the microphone is in the first position, the microphone entirely covers the third opening on the inside of the frame, when the microphone is in the first position, the microphone is arranged in a first plane, and when the microphone is in the second position, the microphone is tilted with respect to the first position and is arranged in a second plane, wherein the first plane and the second plane form an angle of between 10 degrees and 30 degrees.

2. The microphone arrangement of claim 1, wherein, when the microphone is in the first position, an entirety of the microphone is arranged on a first side of the third opening and within the internal volume defined by the frame.

3. The microphone arrangement of claim 1, wherein, when the microphone is in the second position, at least a portion of the microphone including the first opening protrudes through the third opening and is arranged outside of the internal volume defined by the frame.

4. The microphone arrangement of claim 1, wherein the motor comprises a worm gear, and the microphone arrangement further comprises a gear wheel arrangement comprising a helical gear wheel attached to a clutch, wherein the worm gear engages with the helical gear wheel of the gear wheel arrangement, and the motor is configured to rotate the worm gear.

5. The microphone arrangement of claim 4, wherein the motor is configured to rotate the worm gear in a first direction to move the microphone from the first position to the second position, and is configured to rotate the worm gear in a second direction opposite the first direction to move the microphone from the second position to the first position.

6. The microphone arrangement of claim 1 further comprising a printed circuit board, PCB supporting the microphone element and including electrical traces and bonds to electrically couple with the microphone element.

7. The microphone arrangement of claim 6, wherein the PCB defines a second opening to enable ambient sound that passes through the first opening to be received by the microphone element.

8. A vehicle comprising:

an external surface comprising a fourth opening; and a microphone arrangement according to claim 1 mounted on a first side of the external surface on an inside of the vehicle, wherein the third opening of the frame is aligned with the fourth opening such that, when the microphone is in the second position, the first opening is arranged on a second side of the external surface on the outside of the vehicle.

9. The vehicle of claim 8 further comprising a top cover arranged on the microphone and covering all portions of the microphone visible through the fourth opening when the microphone is in the first position, wherein the external surface and the top cover are similar or identical in color.

10. The vehicle of claim 9 further comprising a sealing layer arranged between the top cover and the housing of the microphone, the sealing layer being configured to seal the third opening when the microphone is in the first position.

11. The vehicle of claim 8 further comprising a controller configured to:

receive an indication of an environment condition relevant to protection of the microphone element; and in response to the indication, control the motor to move the microphone to the first position.

12. A microphone arrangement comprising:

a microphone including a microphone element, a housing and a cover, the housing and the cover cooperating with one another to surround the microphone element, and the cover including a first opening to enable the microphone element to detect sound;

a frame defining an internal volume and including a third opening; and a motor configured to position the microphone in a first position and a second position; wherein when the microphone is in the first position, the first opening is arranged on a first side of the third opening and within the internal volume defined by the frame, and when the microphone is in the second position, the first opening is arranged on a second side of the third opening and outside of the internal volume defined by the frame the microphone is arranged directly adjacent to the third opening, when the microphone is in the first position, the microphone entirely covers the third opening on the inside of the frame, when the microphone is in the first position, the microphone is arranged in a first plane, and when the microphone is in the second position, the microphone is tilted with respect to the first position and is arranged in a second plane, wherein the first plane and the second plane form an angle of between 10 degrees and 30 degrees.

13. The microphone arrangement of claim 12, wherein, when the microphone is in the first position, an entirety of the microphone is arranged on a first side of the third opening and within the internal volume defined by the frame.

14. A microphone arrangement comprising:

a microphone including a microphone element, a housing and a cover, the housing and the cover cooperating with one another to surround the microphone element, and the cover including a first opening to enable the microphone element to detect sound;

a frame including a third opening; and a motor configured to position the microphone in a first position or a second position; wherein when the microphone is in the first position, the first opening is arranged on a first side of the third opening and within the frame, and when the microphone is in the second position, the first opening is arranged on a second side of the third opening and outside of the frame, the microphone is arranged directly adjacent to the third opening, when the microphone is in the first position, the microphone entirely covers the third opening on the inside of the frame, when the microphone is in the first position, the microphone is arranged in a first plane, and when the microphone is in the second position, the microphone is tilted with respect to the first position and is arranged in a second plane, wherein the first plane and the second plane form an angle of between 10 degrees and 30 degrees.

* * * * *